United States Patent
Hara

(10) Patent No.: US 7,184,742 B2
(45) Date of Patent: Feb. 27, 2007

(54) HIGH FREQUENCY DEVICE

(75) Inventor: Yoshitaka Hara, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 396 days.

(21) Appl. No.: 10/791,551

(22) Filed: Mar. 2, 2004

(65) Prior Publication Data

US 2004/0176060 A1 Sep. 9, 2004

(30) Foreign Application Priority Data

Mar. 4, 2003 (JP) .............................. 2003-056785

(51) Int. Cl.
*H04B 1/16* (2006.01)
(52) U.S. Cl. ...................... 455/334; 455/307; 455/339; 455/313
(58) Field of Classification Search ................ 455/306, 455/307, 296, 297, 298, 299, 302, 334, 339, 455/340
See application file for complete search history.

(56) References Cited

U.S. PATENT DOCUMENTS

| | | | | |
|---|---|---|---|---|
| 5,335,363 A | * | 8/1994 | Basciano | 455/297 |
| 5,423,064 A | * | 6/1995 | Sakata | 455/307 |
| 5,802,447 A | * | 9/1998 | Miyazaki | 455/76 |
| 6,073,000 A | * | 6/2000 | Shinohara | 455/317 |
| 6,308,047 B1 | * | 10/2001 | Yamamoto et al. | 455/296 |
| 6,570,458 B2 | * | 5/2003 | Cuddy | 455/339 |
| 6,807,405 B1 | * | 10/2004 | Jagger et al. | 455/296 |
| 2002/0089608 A1 | * | 7/2002 | Yamamoto et al. | 348/725 |
| 2002/0173341 A1 | * | 11/2002 | Abdelmonem et al. | 455/307 |
| 2003/0092416 A1 | * | 5/2003 | Tanaka et al. | 455/323 |
| 2003/0216122 A1 | * | 11/2003 | Cordone et al. | 455/63.1 |
| 2004/0021798 A1 | * | 2/2004 | Lindstrom et al. | 455/307 |
| 2004/0166803 A1 | * | 8/2004 | Moloudi et al. | 455/20 |
| 2005/0169585 A1 | * | 8/2005 | Aronson et al. | 455/307 |
| 2005/0186930 A1 | * | 8/2005 | Rofougaran et al. | 455/313 |
| 2006/0058001 A1 | * | 3/2006 | Minnis et al. | 455/334 |

FOREIGN PATENT DOCUMENTS

| | | | |
|---|---|---|---|
| JP | 03-179825 | * | 8/1991 |
| JP | 05-304485 | * | 11/1993 |
| JP | 11-088122 | | 3/1999 |
| JP | 2001-024619 | * | 1/2001 |

* cited by examiner

*Primary Examiner*—Lana Le
(74) *Attorney, Agent, or Firm*—Hogan & Hartson LLP

(57) ABSTRACT

Precision in adjustment of filtering characteristics of a high frequency device is improved by providing a high frequency device comprising a first filter, a frequency converter, and a second filter. The high frequency device comprises a high frequency filter for extracting signal components in a predetermined frequency band from an input signal; a frequency converter for converting frequency of the signal components extracted by the high frequency filter; and an intermediate frequency filter for extracting signal components in a predetermined frequency band from the signal components, the frequency of which is converted by the frequency converter. The high frequency device further comprises a bypass circuit provided in parallel to the intermediate frequency filter downstream of the high frequency filter; and a switching mechanism including a switching circuit for switching connection of a signal path downstream of the high frequency filter to either the intermediate frequency filter or the bypass circuit. Because the intermediate frequency filter can be in a disconnected state while the high frequency device is in adjustment operation, effects of the intermediate frequency filter on adjustment can be suppressed.

8 Claims, 5 Drawing Sheets

HIGH FREQUENCY DEVICE

BACKGROUND OF THE INVENTION

1. Field of the Invention

The present invention relates to a high frequency device having a first filter, a frequency converter, and a second filter, and in particular to a high frequency device which requires adjustment of filter characteristics.

2. Description of the Related Art

High frequency devices, such as those used in a receiver (super-heterodyne system), generally have filters for both the RF (radio frequency band) stage and IF (intermediate frequency) stage. Some devices of this type require adjustment of filtering characteristics, or the like, of the filter in the RF stage after assemblage of the circuit. In the following, while referring to FIG. 1, a structure of a conventional device disclosed in Japanese Patent Laid-open Application No. Hei 11-88122 and a method for adjusting characteristics of the filter in the RF stage will be described.

A high frequency device 80 shown in FIG. 1 has an RF stage section 14 which comprises high frequency filters 16, 20 and an amplifier 18. A signal passed through the high frequency filter 20 is supplied to a mixer 26 for frequency conversion whereby a signal having a frequency in an RF band is converted to have a frequency in an IF band. An IF stage section comprises an intermediate frequency filter 34 and an amplifier 42.

Here, the frequency characteristics (filtering characteristics) of the high frequency filters 16, 20 are adjusted with reference to a signal output from an output terminal 44 at the last stage in the IF-stage section. This adjustment, however, is difficult to achieve with high precision while the intermediate frequency filter 34 is engaged with a normal operation, because the intermediate frequency filter 34 affects the signal from the output terminal 44.

In order to address this problem, the high frequency device 80 is normally provided with a circuit 82 for suppressing the influence of the intermediate frequency filter 34. The circuit 82 comprises a serially connected electric switch 84 and resistance R3 and connects both sides of the intermediate frequency filter 34. When the electric switch 84 remains in an ON state, both sides of the intermediate frequency filter 34 are shorted whereby frequency characteristics relating to a portion including the intermediate frequency filter 34 and the circuit 82 are flattened.

In other words, provision of the circuit 82 enables more precise adjustment of the filtering characteristics of the high frequency filters 16, 20, as compared to a structure without the circuit 82. Note that the electric switch 84 remains in an OFF state while the high frequency device 80 is in normal operation. In other words, the circuit 82 is additionally provided so as to operate only during adjustment of the filtering characteristics.

In the above-described conventional structure, however, the amplitude of a signal is attenuated by the circuit 82 having the electric switch 84, and the frequency characteristics relating to the portion including the intermediate frequency filter 34 and the circuit 82 are not thoroughly flattened. This leads to a problem that the precision of the frequency adjustment cannot be significantly improved. Further, because parasitic capacitance relating to the circuit 82 varies depending on whether the electric switch is turned on or off, frequency characteristics of the circuit 82 are different between when the high frequency device 80 is in normal operation and in adjustment operation. Still further, attenuation of a signal amplitude makes proper adjustment difficult, and may delay completion of adjustment.

SUMMARY OF THE INVENTION

In consideration of the above, there is provided, according to one aspect of the present invention, a high frequency device, comprising a first filter for extracting signal components in a predetermined frequency band from an input signal; a frequency converter for converting a frequency of the signal components extracted by the first filter; a second filter for extracting signal components in a predetermined frequency band from the signal components with a frequency thereof converted by the frequency converter; a bypass circuit for detouring the second filter downstream of the first filter; a switching mechanism including a switching circuit for switching connection of a signal path downstream of the first filter to either the second filter or the bypass circuit.

This arrangement enables, in the high frequency device, disconnection of the second filter using the bypass circuit while adjusting the first filter. The influence of the second filter can thus be suppressed, and adjustment precision can be improved. It should be noted that, during normal operation, the first filter is connected, but the bypass filter is not.

In the high frequency device according to the present invention, the switching mechanism may include a switching circuit for switching the signal path, provided either solely downstream of the second filter or respectively upstream and downstream of the second filter.

In the high frequency device according to the present invention, the frequency converter may include a first frequency converter connected to so as to be provided upstream of the second filter and a second frequency converter provided to the bypass circuit. Here, it should be noted that, when the switching circuits are provided upstream and downstream of the second filter, respectively, frequency converter may be provided upstream of the switching circuit provided upstream of the second filter. Preferably, the frequency converter may variably control a frequency changing amount according to the frequency of a signal input to the frequency converter so that signals having a constant frequency are output from the high frequency device.

Further, in the high frequency device according to the present invention, the bypass circuit may preferably be biased via a resistor so as to have a source power potential.

Still further, in the high frequency device according to the present invention, the second filter may preferably be formed as a unit separate from an integrated circuit which includes the frequency converter and the switching circuit.

According to another aspect of the present invention, there is provided a first filter for extracting signal components in a predetermined frequency band from an input signal having a radio frequency; a frequency converter for converting a frequency of the signal components extracted by the first filter to thereby obtain an IF signal, in which a frequency changing amount is variably controlled according to the frequency of a signal input from an RF-stage section so that IF signals having a constant frequency are obtained; a second filter for extracting signal components in a predetermined frequency band from the IF signal obtained by the frequency converter; a bypass circuit for detouring the second filter downstream of the first filter; a switching mechanism including a switching circuit for switching connection of a signal path downstream of the first filter to either the second filter or the bypass circuit.

In this arrangement, in the tuner high frequency device, using the bypass circuit to disconnect the second filter while adjusting the first filter, influence of the second filter can be suppressed, and improved adjustment precision is therefore possible. It should be noted that, during normal operation, the signal path may be connected to the first filter to avoid use of the bypass filter.

According to still another aspect of the present invention, there is provided an integrated circuit, comprising a frequency converter for converting frequency of signal components extracted using a first filter which extracts signal components in a predetermined frequency band from an input signal; a bypass circuit provided downstream of the first filter, for detouring a second filter which extracts signal components in a predetermined frequency band from the signal components with a frequency thereof converted by the frequency converter; and a switching mechanism including a switching circuit for switching connection of a signal path downstream of the first filter to either the second filter or the bypass circuit.

This integrated circuit, in which the second filter is not included, can facilitate modification of the second filter, including modification of the filter's filtering frequency band.

Preferably, the integrated circuit according to the present invention further comprises a terminal for connecting the second filter, which is formed as a unit separate from the integrated circuit.

Still further, the integrated circuit according to the present invention preferably comprises an external connection terminal via which to input a control signal to the integrated circuit for controlling switching by the switching circuit.

DESCRIPTION OF THE PREFERRED EMBODIMENTS

Figure 1:
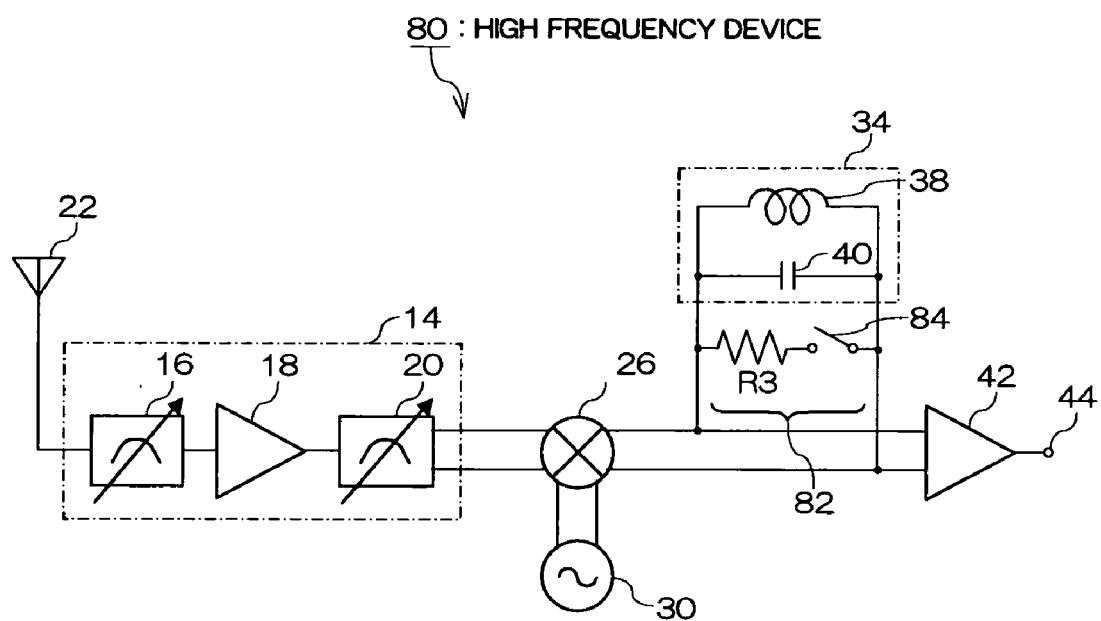
FIG. 1 is a block diagram showing a conventional high frequency device.
Figure 2:
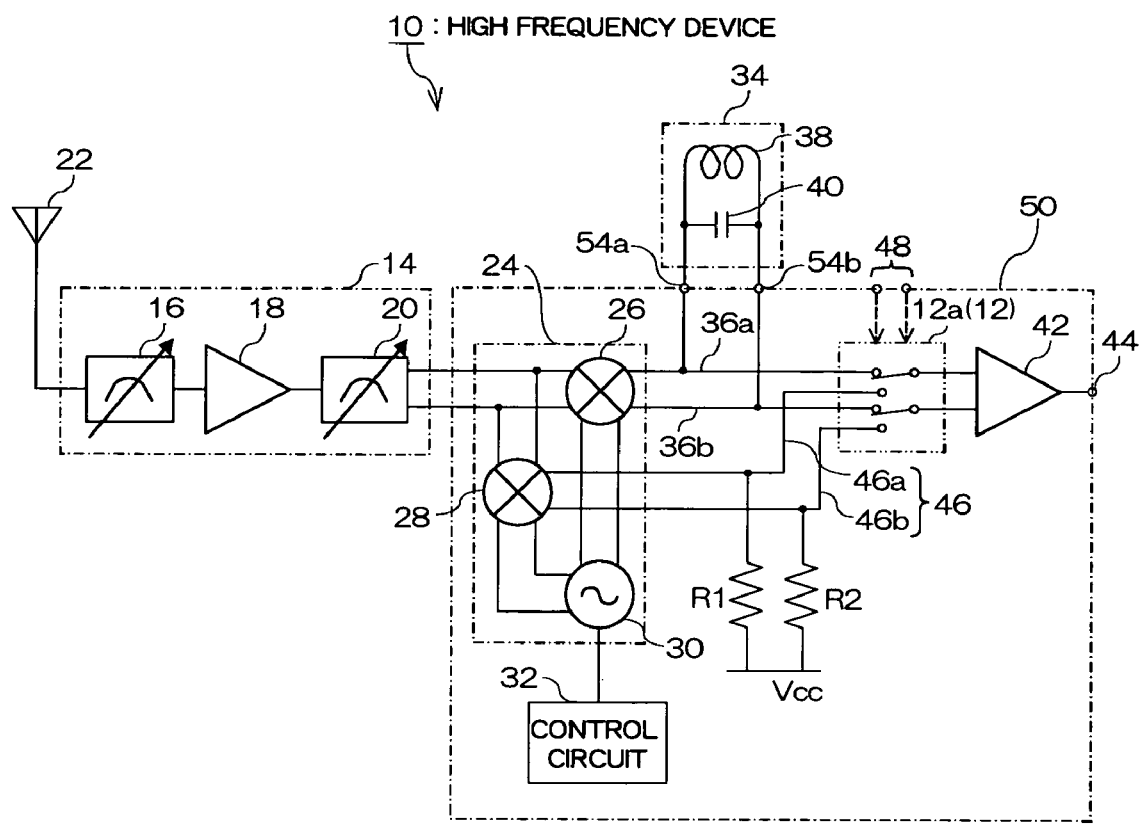
FIG. 2 is a block diagram showing a high frequency device in a first embodiment of the present invention.
Figure 3:
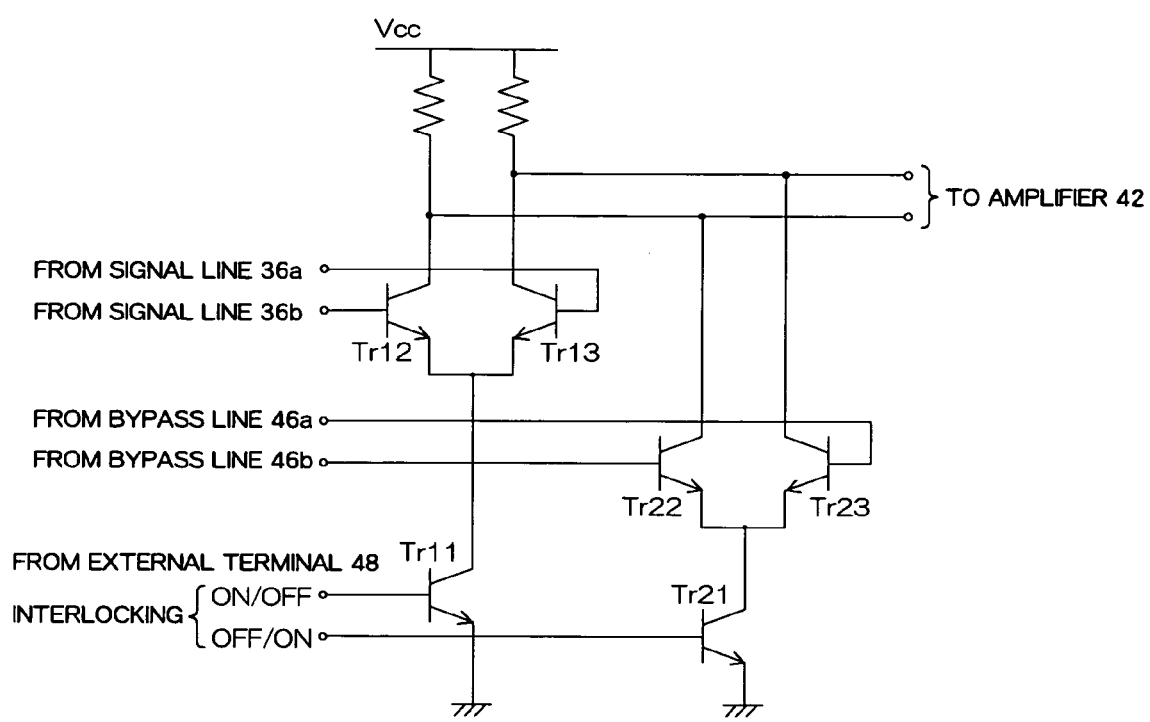
FIG. 3 is a circuit diagram showing an example of a switching circuit installed to a high frequency device of the present invention.

Embodiment 1 (FIGS. 2 and 3)

FIG. 2 is a block diagram showing a high frequency device in a first embodiment. FIG. 3 is an example circuit diagram of a switching circuit 12 mounted to the high frequency device 10.

The high frequency device 10 has an RF stage section 14 which comprises high frequency filters 16, 20 for extracting signal components in respective predetermined frequency bands (relatively large frequency bands) from an input signal, and an amplifier 18. In an example wherein the high frequency device 10 is provided to a TV tuner, then, in the RF stage section 14, signal components in a frequency band of approximately 18 MHz are extracted from a signal (an input signal) received via an antenna 22. The frequency band of approximately 18 MHz corresponds to a band of substantially three channels. The high frequency filters 16, 20 are each constructed as a variable band filter having a variable filtering frequency band and correspond to a first filter of the present invention.

A signal having a radio frequency is then subjected to frequency conversion in a frequency converter 24 to thereby provide a signal having an intermediate frequency. Specifically, the frequency converter 24 comprises mixers 26, 28 and a local oscillator 30, and mixes a signal output from the RF stage section 14 with a signal from the local oscillator 30 in the mixers 26, 28 thereby providing a signal having an intermediate frequency. In this processing, the oscillation frequency of the local oscillator 30 is controlled so as to have a different value depending on a channel selected, by a control circuit 32 including, for example, a PLL circuit (not shown), or the like, so that signals in the same frequency band are output from the mixers 26, 28 (a 40 MHz band for a high frequency device 10 for TV tuning) irrespective of the selected channel.

Signals output from the frequency converter 24 are filtered by an intermediate frequency filter 34 to thereby extract a signal in a further narrower band. The intermediate frequency filter 34 may be constructed, for example, so as to include an inductance 38 and a capacitance 40 arranged in parallel and connecting two parallel signal lines 36a, 36b. In a high frequency device 10 for TV tuning, signals of, for example, 41.25 MHz to 45.75 MHz (for NTSC-US) are extracted through the intermediate frequency filter 34. The signals having passed through the intermediate frequency filter 34 are then amplified by an amplifier 42 before being output from the output terminal 44 as an output signal of the high frequency device 10. It should be noted that the intermediate frequency filter 34 corresponds to a second filter according to the present invention.

The high frequency device 10 in this embodiment further comprises a bypass line 46 in parallel to the intermediate frequency filter 34, and a switching mechanism 12 for switching connection of a signal path to either the intermediate frequency filter 34 or a bypass line 46. In the example of FIG. 2, the bypass line 46 comprises two parallel bypass lines 46a, 46b, which are respectively branched from the signal lines 36a, 36b downstream of the RF-stage section. It should be noted that the bypass lines 46a, 46b are biased via resistors R1, R2, respectively, so as to have a power source potential Vcc. This arrangement is particularly advantageous when the mixer 28 provided to the bypass circuit 46 is constructed using an open collector.

Through operation of the switching mechanism 12, the intermediate frequency filter 34 is connected to the amplifier 42 when the high frequency device 10 is in normal operation, and only when a control signal is input via the external connection terminal 48, the bypass line 46 is connected to the amplifier 42. In the example of FIG. 2, a switching circuit 12a is provided as a switching mechanism 12 upstream of the amplifier 42. Through the operation of the switching circuit 12a, the input terminal of the amplifier 42 can be selectively connected to either the signal lines 36a, 36b (that is, the intermediate frequency filter 34) or the bypass lines 46a, 46b (that is, the bypass circuit 46). With this arrangement, in response to a switching control signal supplied via the external connection terminal 48, the input terminal of the amplifier 42 is caused to be connected to the signal lines 36a, 36b when the high frequency device 10 is in normal operation, and to the bypass lines 46a, 46b when the high frequency device 10 is in adjustment operation.

The switching circuit 12a can be constructed as a circuit including a bi-polar transistor or the like, such as a circuit of FIG. 3, for example. For the circuit of FIG. 3, when a predetermined control current is supplied to the bases of the transistors Tr 11, Tr 21 (that is, when the switching circuit 12 is in an ON state), corresponding signal lines 36a, 36b or bypass lines 46a, 46b serve as a signal path. When such a current is not supplied to the bases (that is, when the switching circuit 12 is in an OFF state), on the other hand, a signal is shielded by the transistors Tr 12, Tr 13, Tr 22, Tr 23. It should be noted that, when the transistor Tr 11 is in an ON state, the transistor Tr 21 is in an OFF state, while the transistor Tr 11 is in an OFF state, the transistor Tr 21 is in an ON state.

The thus constructed high frequency device 10 can adjust characteristics of the high frequency filters 16, 20 using the bypass line 46 while maintaining the intermediate frequency filter 34 in a disconnected state, and therefore can achieve more precise adjustment of the filtering characteristics as compared to the above described conventional structure. It should be noted that, in this embodiment, the mixers 26, 28, the local oscillator 30, the resistances R1, R2, the switching circuit 12a, the amplifier 42, and the control circuit 32 may be formed in an integrated circuit 50, and the intermediate frequency filter 34 may be formed in a different unit to be connected to the integrated circuit via the output terminal 54a, 54b.

Figure 4:
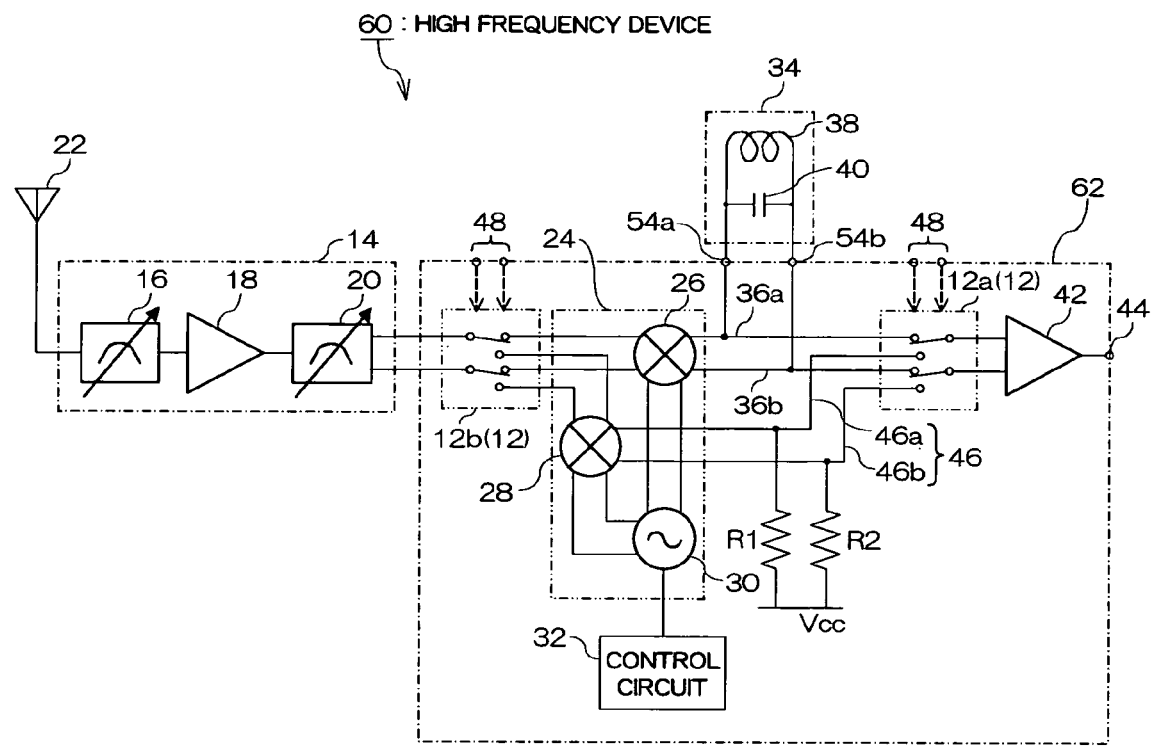
FIG. 4 is a block diagram showing a high frequency device in a second embodiment of the present invention.

Embodiment 2 (FIG. 4)

FIG. 4 is a block diagram showing a high frequency device 60 according to a second embodiment of the present invention. The high frequency device 60 comprises similar structural components to those of the high frequency device 10 in the above described first embodiment, which are thus identified in FIG. 4 using the same reference numerals as in FIG. 2, and which are not described again.

One of the characteristic features of the high frequency device 60 according to this embodiment is the provision of an additional switching circuit 12b upstream of the mixers 26, 28 of the first embodiment. Through the operation of the switching circuit 12b, the output terminal of the high frequency filter 20 can be selectively connected to either the signal lines 36a, 36b (that is, the intermediate frequency filter 34) or the bypass lines 46a, 46b (that is, the bypass line 46). The switching circuit 12b is driven in response to a switching control signal supplied via the external connection terminal 48 so that the output terminal of the high frequency filter 20 is connected to the signal lines 36a, 36b when the high frequency device 60 is in normal operation and to the bypass line 46a, 46b when the high frequency device 60 is in adjustment operation. It should be noted that the switching circuit 12b can have an identical structure to that shown in, for example, FIG. 3.

The thus constructed high frequency device 60 has switching circuits 12a, 12b upstream and downstream of the intermediate frequency filter 34, respectively, and enables disconnection of the intermediate frequency filter 34 at its both sides during adjustment operation. Therefore, this arrangement can achieve more precise adjustment of the high frequency filters 16, 20. It should be noted that, in this embodiment, the mixers 26, 28, the local oscillator 30, the resistances R1, R2, the switching circuit 12a, 12b, the amplifier 42, and the control circuit 32 may be formed in an integrated circuit 62 and the intermediate frequency filter 34 may be formed in a separate unit to be connected to the integrated circuit via the output terminal 54a, 54b.

Figure 5:
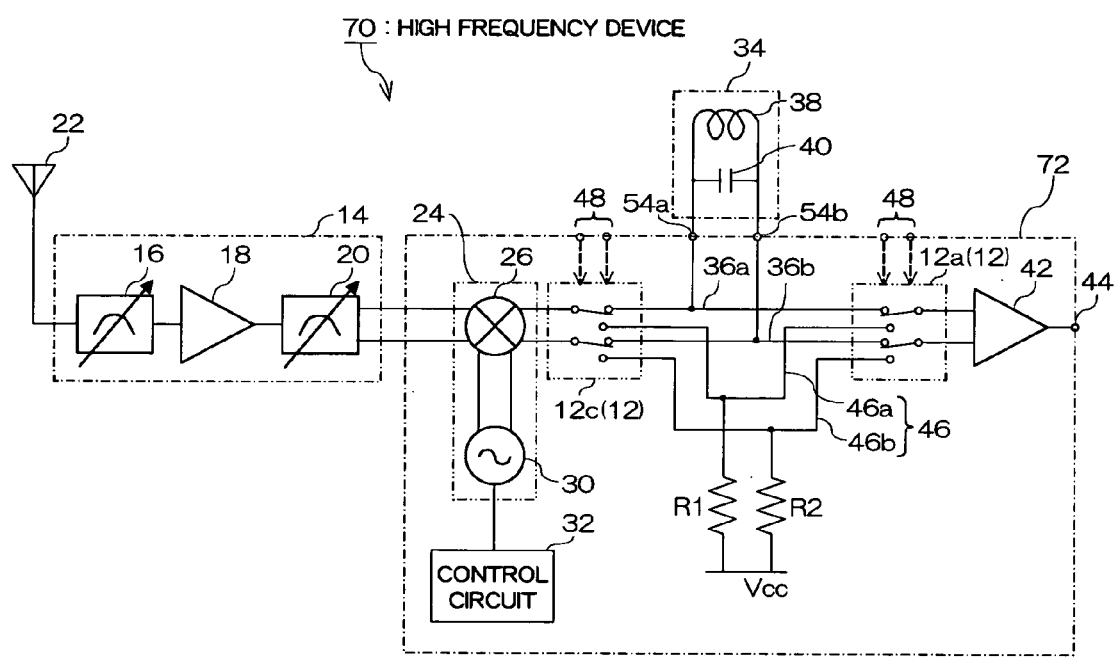
FIG. 5 is a block diagram showing a high frequency device in a third embodiment of the present invention.

Embodiment 3 (FIG. 5)

FIG. 5 is a block diagram showing a high frequency device 70 according to a third embodiment of the present invention. The high frequency device 70 comprises similar structural components to those of the high frequency devices 10, 60 in the above described first and second embodiments, which are thus identified in FIG. 5 using the same reference numerals as in FIGS. 2 and 3, and which are not described again.

One of the characteristic features of the high frequency device 80 according to this embodiment is the provision of an additional switching circuit 12c downstream of the mixer 26. Through the operation of the switching circuit 12c, the output terminal of the mixer 26 can be selectively connected to either the signal lines 36a, 36b (that is, the intermediate frequency filter 34) or the bypass lines 46a, 46b (that is, the bypass line 46). The switching circuit 12c is driven in response to a switching control signal supplied via the external connection terminal 48 so that the output terminal of the mixer 26 is connected to the signal lines 36a, 36b when the high frequency device 80 is in normal operation and to the bypass line 46a, 46b when the high frequency device 80 is in adjustment operation. It should be noted that the switching circuit 12c can have an identical structure to that shown in, for example, FIG. 3.

The thus constructed high frequency device 70 has a simpler structure as a smaller number of mixers 26 are provided as compared to the structures in the first and second embodiments. Additionally, the arrangement in which the switching circuit 12c is provided in a section associated with a lower frequency (that is, an intermediate frequency, or IF), specifically, downstream of the mixer 26, can advantageously reduce the influence of parasitic capacitance of the switching circuit 12c. It should further be noted that, in this embodiment, the mixer 26, the local oscillator 30, the resistances R1, R2, the switching circuits 12a, 12b, the amplifier 42, and the control circuit 32 may be formed in an integrated circuit 72 and the intermediate frequency filter 34 may be formed as a separate unit to be connected to the integrated circuit via the output terminal 54a, 54b.

As described above, with the present invention, precision of adjustment of the filtering characteristics of the filter farther from the output terminal of a high frequency device can be improved through suppression of the influence of the filter closer to the output terminal.

What is claimed is:

1. A high frequency device, comprising:
   a first filter for extracting signal components in a predetermined frequency band from an input signal;
   a frequency converter for converting a frequency of the signal components extracted by the first filter;
   a second filter for extracting signal components in a predetermined frequency band from the signal components with a frequency thereof converted by the frequency converter;
   a bypass circuit for detouring the second filter downstream of the first filter;
   a switching mechanism including a switching circuit for switching connection of a signal path downstream of the first filter to either the second filter or the bypass circuit;
   wherein the switching mechanism includes, downstream of the second filter, a switching circuit for switching the signal path, and
   wherein the frequency converter includes a first frequency converter provided upstream of the second filter and a second frequency converter provided to the bypass circuit.

2. The high frequency device according to claim 1, wherein the frequency converter variably controls a frequency changing amount according to a frequency of a signal input to the frequency converter so that signals having a constant frequency are output.

3. The high frequency device according to claim 1, wherein the bypass circuit is biased via a resistor so as to have a source power potential.

4. The high frequency device according to claim 1, wherein the second filter is formed as a unit separate from an integrated circuit which includes the frequency converter and the switching circuit.

5. A high frequency device, comprising:
- a first filter for extracting signal components in a predetermined frequency band from an input signal;
- a frequency converter for converting a frequency of the signal components extracted by the first filter;
- a second filter for extracting signal components in a predetermined frequency band from the signal components with a frequency thereof convened by the frequency converter;
- a bypass circuit for detouring the second filter downstream of the first filter; and
- a switching mechanism including a switching circuit for switching connection of a signal path downstream of the first filter to either the second filter or the bypass circuit:
- wherein the switching mechanism includes switching circuits provided upstream and downstream of the second filter, respectively, for switching the signal path; and
- wherein the frequency converter includes a first frequency converter provided upstream of the second filter and a second frequency converter provided to the bypass circuit.

6. The high frequency device according to claim 5, wherein the frequency converter variably controls a frequency changing amount according to a frequency of a signal input to the frequency converter so that signals having a constant frequency are output.

7. The high frequency device according to claim 5, wherein the bypass circuit Is biased via a resistor so as to have a source power potential.

8. The high frequency device according to claim 5, wherein the second filter is formed as a unit separate from an integrated circuit which includes the frequency converter and the switching circuit.

* * * * *